United States Patent

[11] 3,624,834

[72] Inventor Pierre Malifaud
   Paris, France
[21] Appl. No. 832,762
[22] Filed June 12, 1969
[45] Patented Nov. 30, 1971
[73] Assignee Agence Nationale De Valorisation De La Recherche (Anvar)
   Puteaux, France
[32] Priority June 12, 1968
[33] France
[31] 154665

[54] OPTICAL CONCENTRATOR WITHOUT FLUX LOSS
   2 Claims, 3 Drawing Figs.
[52] U.S. Cl. .................................................. 350/96, 250/227, 350/199
[51] Int. Cl. .................................................. G02b 5/14
[50] Field of Search ...................................... 350/96; 250/227

[56] References Cited
UNITED STATES PATENTS
3,187,627 6/1965 Kapany ........................ 350/96 B X
3,413,468 11/1968 Astheimer ..................... 350/96 UX
3,467,840 9/1969 Weiner ......................... 350/96 UX FOREIGN PATENTS
1,110,821 4/1968 Great Britain ................ 350/96

Primary Examiner—John K. Corbin
Attorney—Bacon & Thomas

ABSTRACT: The present invention relates to an optical concentrator without flux loss, comprising a parabolic frontal mirror with half opening $\theta_1$ (angle made to the optical axis by a straight line that joins the focus to the mirror edge) effecting a primary concentration of a flux captured from a distance source of radiation, forming a spot image in the smallest section of a beam of convergent rays with half angle opening $\theta_1$ with the optical axis, and a truncated cone mirror whose entrance section of diameter $d_1$ is disposed in coincidence with the total spot image furnished by the said frontal parabolic mirror and whose terminal section which is of smaller diameter is associated with a sensitive element or radiation transformer of a receiver.

OPTICAL CONCENTRATOR WITHOUT FLUX LOSS

BACKGROUND OF THE INVENTION

In such a device, the total spot image furnished by the frontal parabolic mirror is used in order not to lose flux while benefiting from a supplementary concentration by virtue of the associated truncated cone mirror. But thus far the concrete embodiments of the device have been disappointing. This stems from the fact that associations of this type between a parabolic mirror and a truncated cone mirror have been designed empirically. There are two types to be found. In the first, a very open parabolic mirror is provided ($\theta_1 > 40°$) associated with a truncated cone mirror with apex angle relatively wide (more than 1/10 radian for the half angle at the apex). In the second, which moreover does not seem to have been practically constructed, there is provided a very narrow parabolic mirror ($\theta_1 < 10°$ approximately) associated with a bundle of conical optical fibers with very small apex angle (less than 1/100 radian for the half angle). Moreover, these designs involve serious drawbacks. The first does not allow great concentrations. The coma aberration is so significant that the spot image furnished by the parabolic mirror is much too large to be reconcentrated efficiently by the truncated cone mirror. Furthermore, this latter element which is not optimized generally has a substantial flux loss. The second design involves a great loss of flux by absorption and because of the very high number of internal reflections in the fibers. No design of prior art furnishes the optimal solution to the problem posed by the combination of a parabolic mirror and a truncated cone mirror, to effect concentration without flux loss. The results are mediocre and in no instance are they predetermined.

SUMMARY OF THE INVENTION

The present invention is intended to remedy these various drawbacks, allowing the attaining without loss of flux of a concentration (i.e., amplification of illumination) that approaches the maximum limit concentration according to a predetermined relationship. For this, it relates to an optical concentrator of the above-mentioned type, characterized in that the half angle of opening $\theta_1$ of the frontal parabolic mirror, the half angle at the apex $\gamma$ and diameter $d_2$ of the end section of the truncated cone mirror are determined by the following equations of dimension:

$$\cos^6 \theta_1 = A \qquad (1)$$
$$tg\gamma = tg^3\theta_1 \qquad (2)$$
$$\frac{d_1}{d_2} = \frac{\cos \gamma}{\sin(\theta_1 + \gamma)} \qquad (3)$$

A being a predetermined value of the ratio between illumination obtained in the end section of the truncated cone mirror and the maximum limit illumination for a specific captured flux.

In this way, for a source of radiation of given apparent diameter, assumed to be distant, and for a given diameter of the entrance pupil of the device (i.e., for a given diameter of the parabolic mirror) with predetermined ratio A, it is possible to determine unequivocally, in a unique optimal combination, the half angle of opening $\theta_1$ of the frontal parabolic mirror and the dimensions of the truncated cone mirror which allow close approximation, except for ratio A, to the limit maximum concentration without loss of flux.

In practice, the value of half angle of opening $\theta_1$ determined by means of the above equations of dimensions is between 10° and 30°. The value of the half angle at apex $\gamma$ of the truncated cone mirror is between 1/60 and 1/10 radian. In each case, a single pair of these values is determined. For the values of half angle of opening $\theta_1$ thus practically between 10° and 30°, the function expressed by equation (1) can be regarded as linear. It is then possible advantageously to use the following numerical equation of dimensions to compute the half angle of opening $\theta_1$ in sexagesimals.

$$\theta_1 = \frac{1.15 - A}{0.0225} \qquad (4)$$

The object of the present invention will be still better understood through the following description of several embodiments which are nonlimitative, and through the attached drawing in which:

DESCRIPTION OF THE PREFERRED EMBODIMENT

Figure 1:
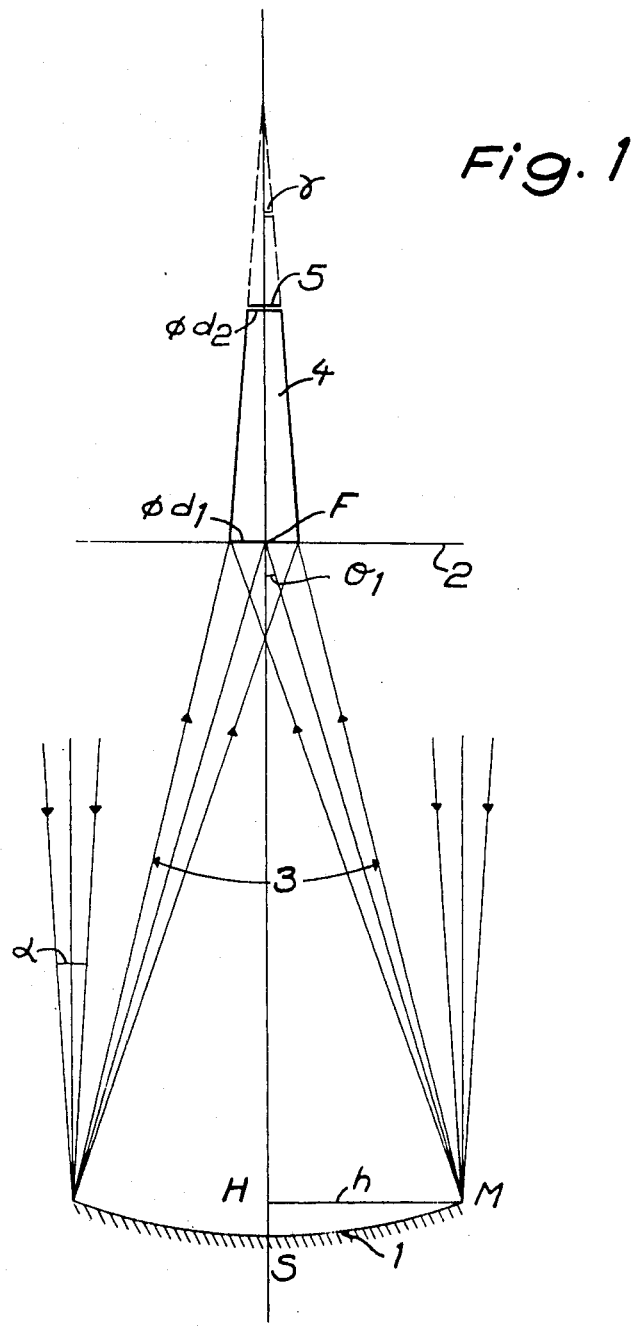
FIG. 1 shows an optical schema of the device of the invention.

In FIG. 1 there is seen an optical concentrator comprising in combination on the one hand a frontal parabolic mirror 1 with vertex S and focus F whose entrance pupil of radius MH captures a flux emanating from a distant source of radiation which is not represented, of apparent diameter $\alpha$, the said parabolic mirror forming a spot image (flawed by aberration) of the source in its focal plane 2 by a convergent beam of rays 3 having a half angle (average) $\theta_1$ determined according to the invention, and on the other hand a truncated cone mirror 4 whose entrance section of diameter $d_1$ is disposed in the plane of image 2 in coincidence with the totality of the spot image mentioned above, the said truncated cone mirror having a half angle at the apex $\gamma$ and a terminal section with diameter $d_2$ determined according to the invention and associated with the sensitive element or radiation transformer 5 of a receiver.

If a value A is set for the ratio between illumination that is to be attained in the terminal section of the truncated cone mirror and the limit maximum illumination, and if moreover the diameter of the entrance pupil of the parabolic mirror and the apparent diameter of the radiation source are known, it is possible according to the invention unequivocally to determine in unique optimal combination the half angle opening $\theta_1$ of parabolic mirror 1 and the dimensions characterizing the truncated cone mirror 4 by means of the above-mentioned equations:

$$\cos^6 \theta_1 = A \qquad (1)$$
$$tg\gamma = tg^3\theta_1 \qquad (2)$$
$$\frac{d_1}{d_2} = \frac{\cos \gamma}{\sin(\theta_1 + \gamma)} \qquad (3)$$

The diameter $d_1$ of the total spot image furnished by the frontal parabolic mirror is given by the following known equation, designating by $\alpha$ the apparent diameter of the radiation source which is assumed to be distant, and using $h$ to describe radius MH (See FIG. 1) of the entrance pupil of the parabolic mirror:

$$d_1 = h \cdot \frac{1 + tg^2\theta_1}{tg\theta_1} \cdot tg\alpha \qquad (5)$$

The following numerical example shows the way of determining the half angle of opening $\theta_1$ and of constructing the truncated cone mirror 4 in a specific case.

Let us assume a source of radiation, fairly distant, of apparent diameter $\alpha = 5°$. The diameter of the entrance section of the frontal parabolic mirror is 50 mm. Thus, $h=25$ mm. We assume that the predetermined value of A is 0.80. We have equation (1): $\cos \theta_1 = \sqrt[6]{0.8} = 0.9635$. Hence $\theta_1 = 15°\ 32'$ and $tg\theta_1 = 0.02147$.

According to equation (2), $tg\ \gamma = 0.02147$.

Then: $\gamma = 1/46.6$ radian $(=1°\ 14')$.

Applying equation (5): $d_1 = 8.48$ mm., and through application of equation (3) we find:

$$d_1/d_2 = 3.47\ mm.$$

hence $$d_2 = 2.44\ mm.$$

The length L of the truncated cone mirror is equal to $(8.48-2.44)\ 2\ tg\ \gamma$ or $$L = 140.5\ mm.$$

Figure 2:
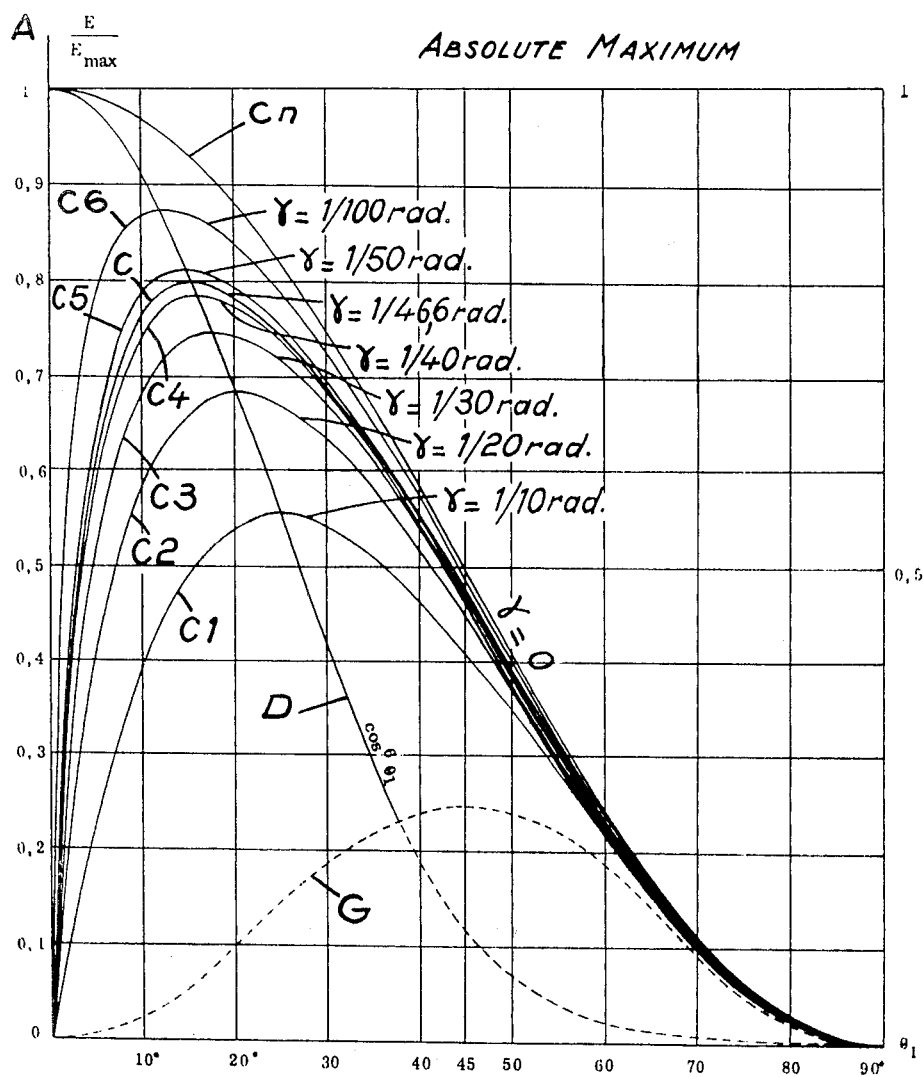
FIG. 2 shows a graph illustrating the variations of ratio A as a function of the half angle $\theta_1$ of the frontal parabolic mirror and for various values of the apex half angle $\gamma$ of the associated truncated cone mirror.

It is understood through graph FIG. 2 why this optical concentrator, thus dimensioned, is optimal. The possible values of half angle of opening $\theta_1$ of the frontal parabolic mirror are plotted in abscissas and the ordinates are values of ratio A (yield in illumination in proportion to maximum limit illumination) with $\gamma$ constant for a certain number of values of the half angle at the apex $\gamma$ of the truncated cone mirror. It is seen that each curve with constant $\gamma$ such as $C_1, C_2 ... C_n$ presents a characteristic giving to A a maximum value for a pair of values of $\theta_1$ and $\gamma$, the said value pair being well determined. The location of these crests is curve D, which shows maximum values of A as a function of $\theta_1$ according to equation (1): $A_{max} = \cos^6 \theta_1$. It is seen on this curve D, for example, that ratio A on curve C with constant $\gamma$ at $1/46.6$ radian reaches the value 0.80 for the optimal pair of values: $15°\ 32'$ for and $1/46.6$ radian for $\gamma$. This pair of values is optimal in the sense that the half angle at the apex $\gamma$ of the truncated cone mirror is thus the widest possible, which is advantageous (shorter truncated cone mirror, lower number of internal reflections). It is to be seen, following the horizontal line A=0.80, that when values other than $15°\ 32'$ are adopted for $\theta_1$, angles $\gamma$ must be less than $1/46.6$ radian.

It is possible to inquire what latitude there may be in the choice of $\theta_1$. It is possible to depart by several degrees without changing the value of $\gamma$ too much, which is advantageous in consideration of manufacturing tolerances, but then the values $\gamma$ increase very rapidly and the zone of optimization is completely left behind. This can be verified for the numerical example given above. The optimal value of $\theta_1$ was $15°\ 32'$, and it corresponded to the optimal value of $1/46.6$ radian for $\gamma$. If the predetermined value of A is held at 0.80, the value of $\gamma$ for $\theta_1 = 20°$ can be calculated, for example, by means of the general equation:

$$A = \frac{\sin \theta_1}{tg\theta_1 + tg\gamma} \quad (6)$$

We find that $\gamma = 1/54.6$ radian. This is an acceptable result. The average number $\overline{P}$ of internal reflections in the truncated cone mirror can be calculated by means of the general equation:

$$\overline{P} = 0.64\ \frac{\frac{\pi}{2} - \theta_1}{2\gamma} \quad (7)$$

We find 21 reflections for $\theta_1 = 20°$, instead of 19 reflections for $\theta_1 = 15°\ 32'$.

On the contrary, for a value of $\theta_1$ which is a little further from $15°\ 32'$, such as $\theta_1 = 25°$ for example, the results are very different. We find $\gamma = 1/160$ radian which changes the length of the truncated cone mirror to 260 mm. instead of 140.5 mm., as in the optimal device. The average number of internal reflections goes from 19 to 58.

If we go beyond this value of 25° for $\theta_1$ in the present case, the half angle $\gamma$ increases very rapidly. The limit value is $\theta_1 = 26°\ 34'$ for which $\gamma = 0$. The truncated cone mirror becomes infinitely long and the number of reflections also becomes infinite. For values of $\theta_1$ greater than $26°\ 34'$ there is no solution, i.e., it is impossible to construct a truncated cone mirror capably of furnishing a yield of illumination equal to 0.80 without loss of flux, in combination with a frontal parabolic mirror.

Figure 3:
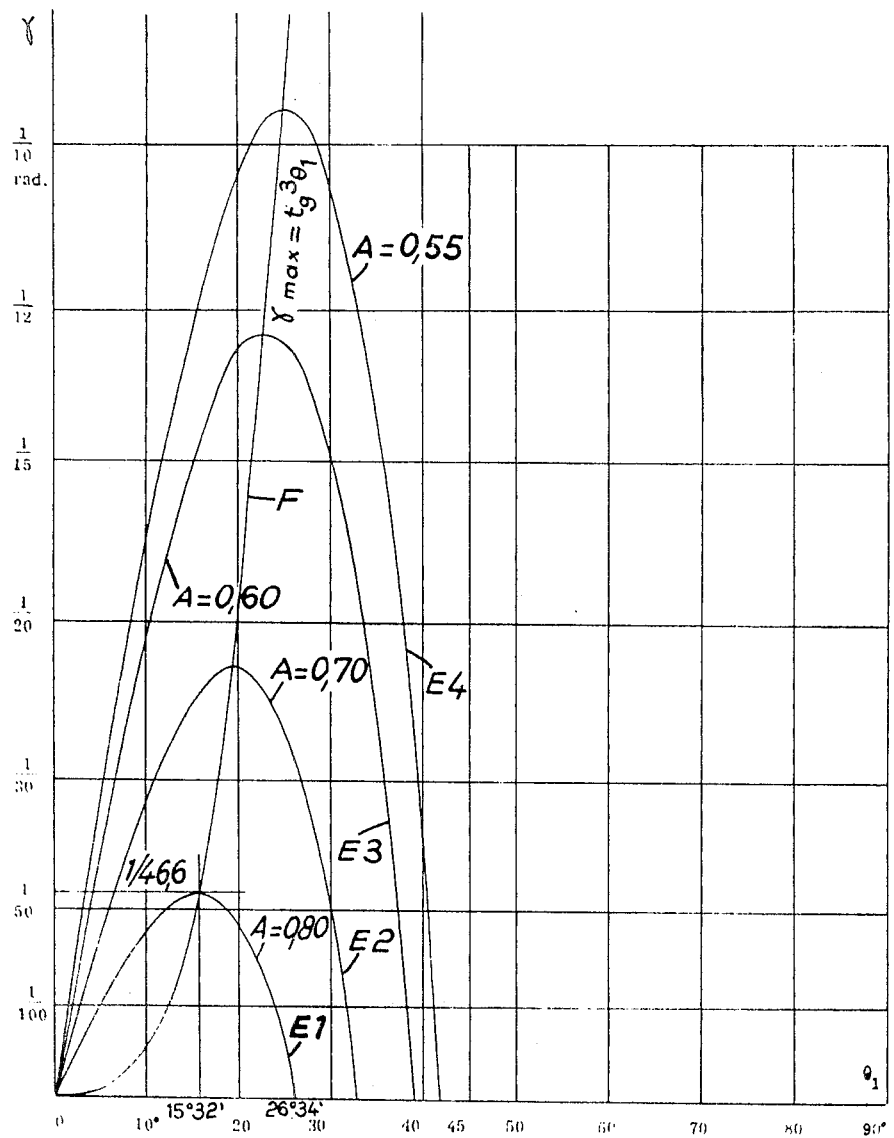
FIG. 3 shows a graph illustrating the variations of the half angle at the apex $\gamma$ of the truncated cone mirror as a function of the half angle of opening $\theta_1$ of the frontal parabolic mirror for various predetermined values of A.

It is understood, through the graph of FIG. 3, why this is the case. The possible values for the half angle of opening $\theta_1$ of the frontal parabolic mirror are plotted as abscissas and the values of the half angle at the apex $\gamma$ of the associated truncated cone mirror are on the ordinates, for a certain number of predetermined values of ratio A (yield in illumination). It is seen that each curve such as $E_1, E_2, E_3$ etc. ... with constant A presents a characteristic that corresponds to an optimal pair of values for $\theta_1$ and $\gamma$. The location of these crests is curve F which presents maximum values of $\gamma$ as a function of $\theta_1$ according to equation (2): $\gamma\ max = tg^3\ \theta_1$. For example, as can be seen in curve $E_1$ for the predetermined value of 0.80 for A, the optimal pair is $\theta_1 = 15°\ 32'$ and $\gamma = 1/46.6$ radian. Any value other than $15°\ 32'$ assigned to $\theta_1$ leads to a value of $\gamma$ which is less than $1/46.6$ radian, and this is a drawback. For $\theta_1 > 26°\ 34'$ there is no longer a value of $\gamma$ such as A=0.80.

The device of the invention is thus optimized within rather close limits. In contrast, the prior empirical designs are not very efficient. According to one known design, a frontal parabolic mirror is provided which is very open ($\theta_1 > 40°$) associated with a truncated cone mirror with apex angle relatively wide (half angle $\gamma > 1/10$ radian). In these conditions the graph of FIG. 2 shows that great concentration is not to be anticipated. For $\theta_1 = 60°$ which is the present value for a solar energy concentrator, for example, yield A in illumination is in a range between 0.20 and 0.25, no matter what value may be assigned to $\gamma$. The yield in illumination of a parabolic mirror used alone has been shown by curve G in dashed lines in FIG. 2. The maximum yield (0.25) is obtained for $\theta_1 = 45°$. For this value of $\theta_1$ the addition of a truncated cone mirror to the parabolic mirror can increase the yield in illumination up to 0.50 depending upon the value assigned to $\gamma$. For $\gamma = 1/10$ radian, there is curve $C_1$:A=0.41 approximately. This, assuming that the truncated cone mirror is optimized according to equation (3) above. Since this is not the case in the empirical combinations previously tried, the yield in illumination is in fact always much below these last figures.

According to another known design, there is provided a frontal parabolic mirror with rather small opening ($\theta_1 < 10°$) associated with a conical bundle of optical fibers with apex angle that is very small ($\gamma < 1/100$ radian). This design is not workable. Assuming that the conical optic fibers are optimized according at least to equation (3) which is not the case, there would be very great flux losses because of absorption of these long fibers and because of the extremely high number of internal reflections.

The concentrator of the invention can be associated with a plurality of elementary truncated cone mirrors mounted in a bundle and functioning in parallel with a single frontal parabolic mirror. These truncated cone mirrors can be contiguous pyramids with square or hexagonal base, for example. The advantages that result from these modification are the following. It is thus possible to reproduce on the sensitive element of the receiver associated with the terminal section of the truncated cone mirror a mosaic image of the radiation source, or at least it is possible to localize the region in space where this radiation source is found. Furthermore, the length of the bundle of elementary truncated cone mirrors thus formed is shorter in proportion to the square root of the number of elementary mirrors (in a section passing through the optical axis) than that of a single equivalent truncated cone mirror. The bundle of elementary truncated cone mirrors can be constituted of conical optical fibers but then each of the said fibers has an optimized dimensioning according to equations (2) and (3) and is associated in optimal combination with a frontal parabolic mirror whose half angle of opening $\theta_1$ is given by equation (1). Such optimized conical optical fibers have a half angle at the apex that is much larger ($1/60 < \gamma < 1/10$ radian, approximately) than that of the conical optical fibers commonly utilized.

The present invention can receive the most diverse applications, especially in solar energy concentrators and in the field of infrared detection, or in supply of lasers, particularly solid-state lasers that are continuously supplied, etc.

I claim:

1. Optical concentrator without flux loss, comprising a frontal parabolic mirror with half opening angle $\theta_1$ (angle made by a straight line joining the focus to the mirror edge and the optical axis) affecting a primary concentration of a flux captured from a distant radiation source, forming a spot image in the smallest section of a bundle of convergent rays with half angle of opening $\theta_1$ with the optical axis, and a truncated cone mirror whose entrance section of diameter $d_1$ is disposed in coincidence with the total spot image furnished by the said frontal parabolic mirror and whose terminal section which is of smaller diameter is associated with a sensitive element or radiation transformer of a receiver, characterized in that the half angle of opening $\theta_1$ of the frontal parabolic mirror (1), the half angle at the apex $\gamma$ and the diameter $d_2$ of the terminal section of the truncated cone mirror (4) are determined by dimensioning equations as follows:

$$\cos^6 \theta_1 = A \quad (1)$$

$$tg\gamma = tg^3\theta_1 \quad (2)$$

$$\frac{d_1}{d_2} = \frac{\cos \gamma}{\sin (\theta_1 + \gamma)} \quad (3)$$

A being a predetermined value of the ratio between illumination obtained in the terminal section of the truncated cone mirror and the limit of maximum illumination for a specific captured flux.

2. Optical concentrator as in claim 1, characterized in that in the case in which the half angle of opening $\theta_1$ is between 10° and 30°, angle $\theta_1$ is determined by the following equation:

$$\theta_1 = \frac{1.15 - A}{0.0225}$$

* * * * *